Dec. 2, 1958  A. L. KOUP  2,862,361
FLUID COUPLING
Filed May 16, 1952  3 Sheets-Sheet 1

INVENTOR
ALFRED L. KOUP
BY *M. B. Tasker*
ATTORNEY

Dec. 2, 1958 A. L. KOUP 2,862,361
FLUID COUPLING
Filed May 16, 1952 3 Sheets-Sheet 2

INVENTOR
ALFRED L. KOUP
BY *M. B. Tasker*
ATTORNEY

Dec. 2, 1958  A. L. KOUP  2,862,361
FLUID COUPLING

Filed May 16, 1952  3 Sheets-Sheet 3

INVENTOR
ALFRED L. KOUP
BY
ATTORNEY

United States Patent Office 2,862,361
Patented Dec. 2, 1958

2,862,361

FLUID COUPLING

Alfred L. Koup, Stratford, Conn., assignor to United Aircraft Corporation, East Hartford, Conn., a corporation of Delaware Application May 16, 1952, Serial No. 288,197

2 Claims. (Cl. 60—54)

This invention relates to transmission mechanism for rotary wing aircraft of the helicopter type, and particularly to improved hydro-mechanical clutch mechanism which is capable of accelerating the rotor without damaging the rotor blades or rotor head.

A clutch mechanism of this type is disclosed in a copending application of Alfred L. Koup and Arthur A. Wagner, Patent No. 2,644,535, issued July 7, 1953, and assigned to the assignee of this application, in which a fluid coupling and a freewheeling clutch form parallel drives between the engine and the rotor. The fluid coupling which is capable of transmitting only a small fraction of the torque which can be developed by the engine is used to safely accelerate the rotor to an R. P. M. at which centrifugal forces developed in the blades make it safe to connect the engine to the rotor through the hard drive afforded by the freewheeling clutch. The filling and draining of the fluid coupling in the aforementioned application structure is controlled by valves which open and close in response to centrifugal forces i. e. engine R. P. M.

It is an object of this invention to provide improved means directly under the control of the pilot for filling and draining the fluid coupling of such a hydro-mechanical clutch mechanism.

Another object of the invention is to provide a driver element for a fluid coupling having improved means for introducing fluid to the coupling, improved fluid discharge means therefrom and means for bleeding air from the interior of the coupling which may have entered with the fluid as well as air which is displaced upon the introduction of the fluid.

A further object of the invention is to provide a hydro-mechanical clutch mechanism for a helicopter in which the axis of the clutch mechanism is inclined to the vertical.

A still further object of the invention is the provision of a clutch mechanism of this type in which the governor which controls the connection of the freewheeling clutch has a direct driving connection with the engine driven shaft.

A further object of the invention is generally to improve the construction and operation of helicopter drives.

These and other objects and advantages of the invention will be pointed out or will be apparent from the following detailed description of what is now believed to be the preferred form of the invention as illustrated in the accompanying drawings.

Figure 1:
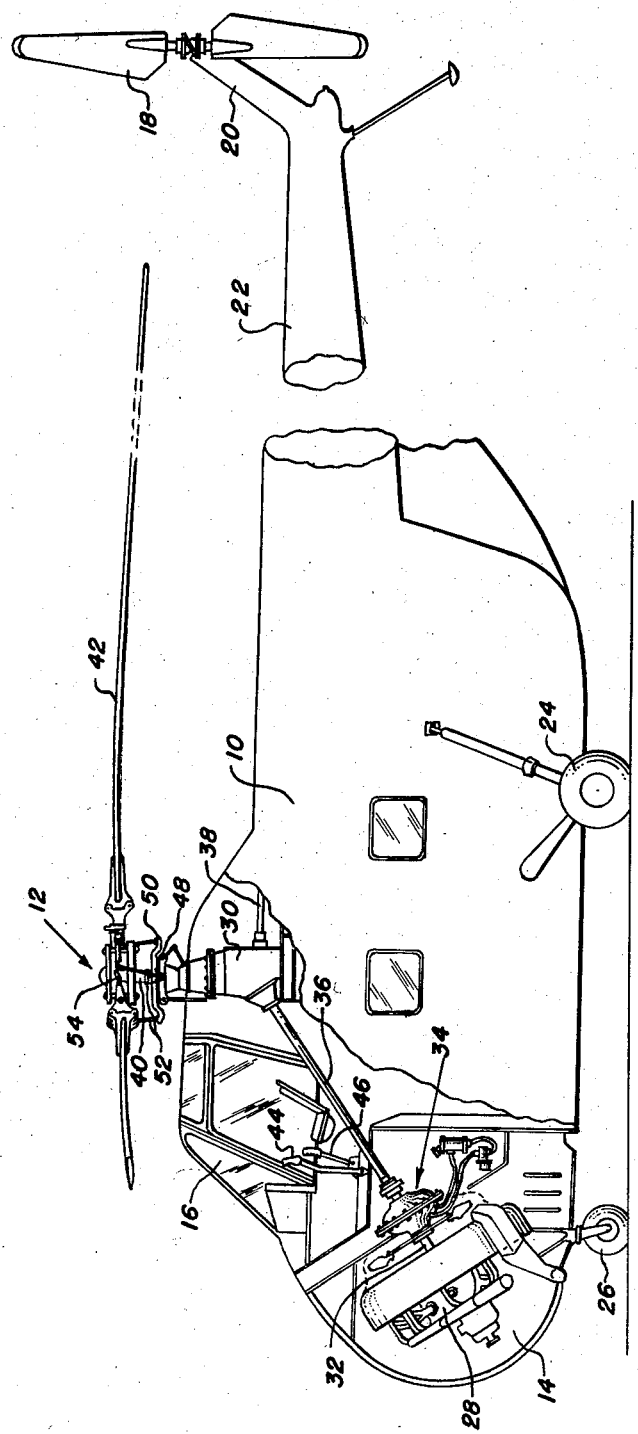
Fig. 1 is a side view of a helicopter embodying the invention, part of the tail cone being broken away to facilitate illustration.

As shown in Fig. 1, the helicopter chosen to illustrate the invention includes a fuselage including a main passenger or cargo compartment 10 located beneath the main rotor 12, an engine compartment 14 in the nose of the fuselage and a pilot compartment 16 generally forward of the cargo compartment and above the engine compartment. The helicopter also includes the usual anti-torque tail rotor 18 mounted on a pylon 20 at the aft extremity of a tail cone 22. The helicopter is supported on the usual main landing gear 24 and nose landing gear 26.

The rotor is driven by an engine 28 which herein is of the radial cylinder type having its axis of rotation inclined upwardly and aft toward a gear box 30 beneath the rotor axis. The engine includes a driven shaft 32 which may be the crankshaft or an extension thereof connected to clutch mechanism generally indicated at 34 interposed between the engine driven shaft 32 and the oblique shaft 36 connected with the driving elements in the gear box 30. Extending aft from the gear box is a generally horizontal drive shaft 38 which drives the tail rotor 18 and extending generally upwardly therefrom is a drive shaft 40 which drives the main sustaining rotor 12. The main rotor includes the usual rotor blades 42 having articulated connections to the rotor head for permitting movement both in a vertical flapping direction and in the plane of rotation of the blades about the usual drag hinges. The blades are also mounted for movement about their longitudinal axes in the usual manner to effect changes in blade pitch.

The pitch of the blades 42 is controlled from the pilot's compartment by the usual cyclic pitch control stick 44 and total pitch control lever 46 through suitable connections to non-rotatable and rotatable swashplate members 48 and 50. Movement of the rotatable plate 50 either vertically to change the pitch of the blades collectively or in azimuth to change the pitch of the blades cyclically, is conveyed through suitable linkage including the rods 52 to blade horns 54.

Figure 2:
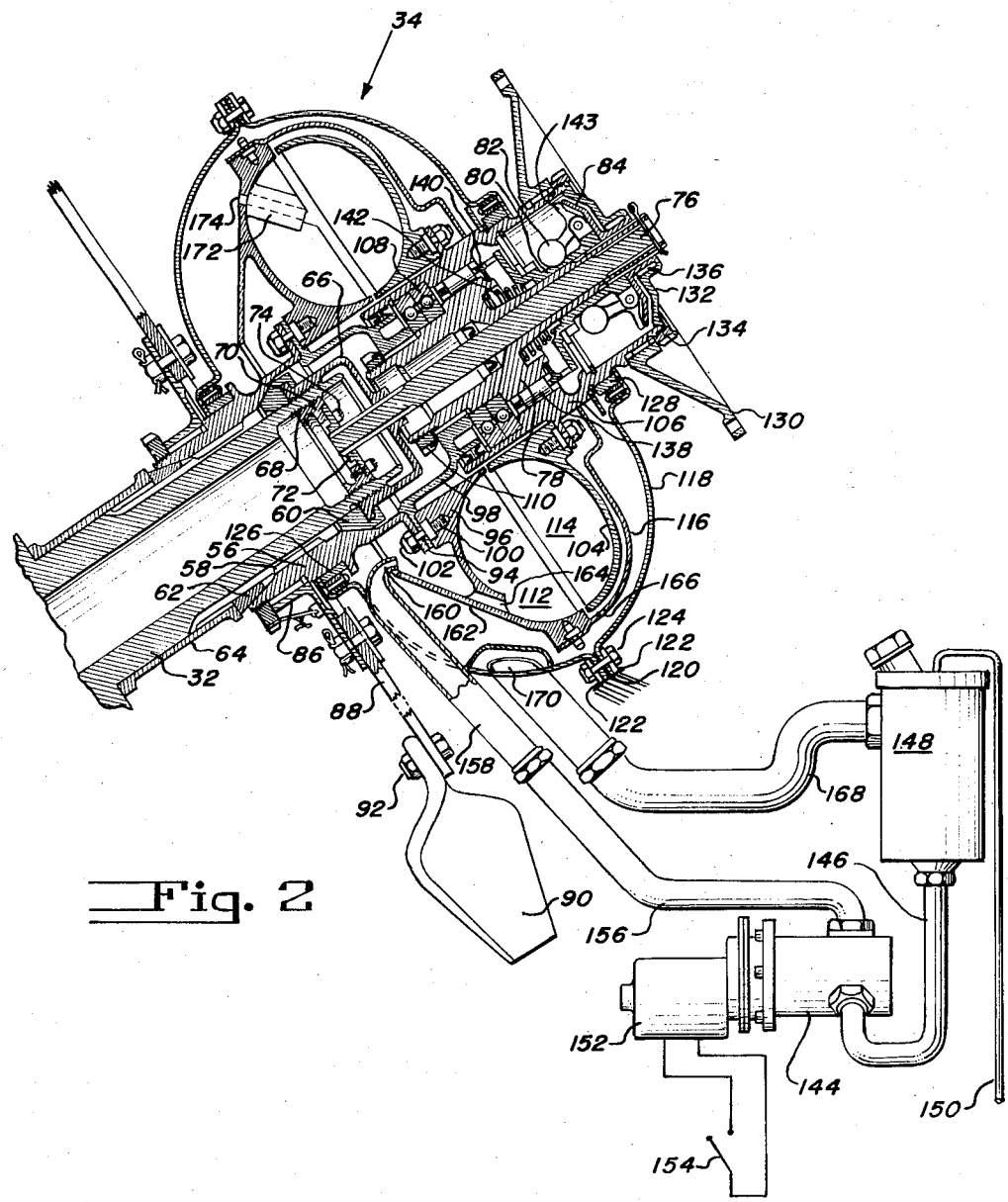
Fig. 2 is an enlarged sectional view of the improved clutch mechanism.

Referring to Fig. 2, the engine driven shaft 32 has a hub 56 splined to it at 58 and held against axial displacement on the shaft by upper and lower cones 60 and 62. The lower cone is supported by a spacer 64 which at its lower end engages a shoulder on the shaft. The upper cone is tightened against the hub by a drive shaft nut 66 which is threaded onto external threads on the shaft and bears against cone 60. Shaft 32 which is a hollow shaft has internal threads 68 which receive a threaded plate 70 to which a lock plate 72 is secured by a series of cap screws 74. Both the lock plate and the nut 66 have axial splined passages in which the lower splined end of a torque shaft 76 is received. The upper end of shaft 76 is splined for use as a wrench to be used to install the clutch.

Hub 56 has a fan hub 86 splined thereto which carries a fan disc 88 to which fan blades 90 are secured by suitable bolts 92. Hub 56 also has an upper flange 94 which supports the driver element 96 of a fluid coupling as well as a mechanical coupling 98 which is splined at its upper end to freewheeling cam 78 which in turn is splined to an actuator sleeve 80 which carries governor flyballs 82 and a governor actuator stop 84, both coupling elements 96 and 98 being secured to flange 94 by a series of studs 100, threaded into driver 96, and nuts 102. The runner element 104 of the fluid coupling has a similar stud and nut connection to a housing 106 of the freewheeling clutch, suitable antifriction bearings 108 being provided between the housing 106 and the freewheeling clutch cam 78 and between housing 106 and coupling 98. The parts of the freewheeling clutch are held in the aforesaid relationship by a spanner nut 110.

The fluid coupling is relatively small and light in weight, being designed to transmit only a small fraction of the torque which the engine 28 is capable of developing. The driver member 96 includes a plurality of integral vanes 112 (Fig. 3) and the runner element 104 similarly includes a plurality of vanes 114.

The driver member 96 carries a shield 116 which encloses the runner element 104 and the entire fluid coupling is enclosed by a fixed housing 118 which has upper and lower complemental housing parts having meeting peripheral flanges 120 which are connected together with stiffener rings 122 by bolts 124. The upper and lower parts of housing 118 are supported on the hub 56 and the housing 106 by annular bearings 126 and 128 respectively.

Housing 106 has a splined connection at its upper end to a flange coupling 130 and also carries at its upper end a bearing support 132, the bearing support and the coupling being secured in position on the housing by locknut 134. The bearing support 132 carries a needle bearing 136 which supports the governor actuator stop 84 and the upper end of freewheeling clutch cam 78 previously mentioned.

It will thus be evident that when the fluid coupling is filled and the engine is rotating, a limited driving torque can be transmitted from the engine to the flange coupling 130 and hence to the rotor but that the amount of torque thus transmitted is limited to the small torque capacity of the fluid coupling. Thus the torque initially applied to the rotor in starting it is never sufficient to damage the blades when they are in a static position and do not have the centrifugal restoring force to relieve a starting torque. Even this small torque can never be suddenly applied due to the inherent tendency of the coupling to slip under suddenly applied torque as for example might occur if the engine were inadvertently started with its throttle open.

As described more in detail in the Koup and Wagner patent referred to above, the governor, the flyballs 82 of which have been mentioned, is designed to connect the freewheeling clutch cam 78 to the drive housing 106 only when the engine R. P. M. is sufficient to develop centrifugal forces in the blades sufficient to enable them to safely withstand full engine torque even if suddenly applied. To this end freewheeling clutch rollers 138 are supported in a roller retainer 140 which is cammed against the action of a spring 142 by levers 143 into a position in which the clutch rollers are in driving engagement between cam 78 and housing 106 upon outward movement of the flyballs 82. At this point in the operation of the transmission the fluid coupling is drained and a direct hard drive through the freewheeling clutch is provided. This particular mechanism forms no part of the present invention and reference is made to the Koup and Wagner application for a detailed disclosure thereof.

In accordance with the present invention, improved means is provided for filling and emptying the fluid coupling under the direct control of the pilot, which is particularly adapted to the inclined position of the clutch mechanism in the oblique drive shown herein. The invention would also be applicable to a horizontal installation.

Figure 3:
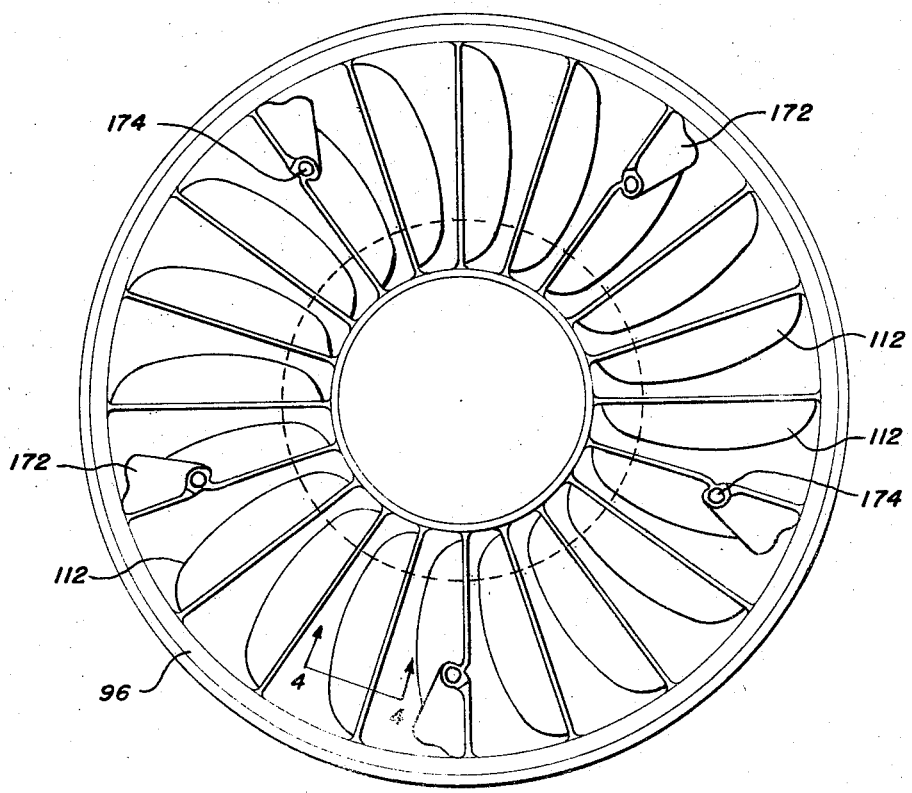
Fig. 3 is a detailed perspective view of the driver element of the fluid coupling.
Figure 4:
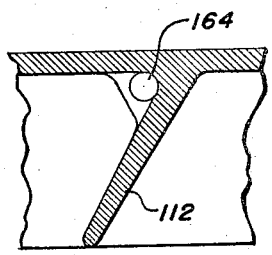
Fig. 4 is an enlarged detail section on line 4—4 of Fig. 3.

To fill the coupling a fluid pump 144 is provided which receives fluid through a conduit 146 from a reservoir 148 vented to the atmosphere through a pipe 150. The pump is driven by an electric motor 152 controlled by a switch 154 located in the pilot compartment 16 and discharges through a conduit 156 which connects with a nozzle tube 158 carried by housing 118. When switch 154 is closed to operate pump 144, fluid is discharged through a nozzle 160 onto a conical slinger plate 162 forming a part of and hence rotatable with driver element 96 of the fluid coupling. This plate which is a rough casting for better frictional engagement with the oil, is slightly outwardly and downwardly inclined from the horizontal at the point where it passes nozzle 160 and has, upon rotation, a tendency to carry with it any oil which strikes it and centrifugally force the oil through intake ports 164 (Fig. 4) into the coupling. One of these ports 164 is provided at the root of each blade 112 which, as will be seen from Fig. 3, are inclined in the direction of rotation of the driver. Due to the rotation of the driver 96 and the action of the vanes 112, the admission of fluid will create a vortex in the coupling which would appear in a counterclockwise direction in the lower portion of the coupling shown in Fig. 2. Thus the discharge end of the ports 164 would fall in the same direction as the vortex which would tend to draw more fluid into the coupling by the resulting venturi effect.

Oil is constantly drained from the coupling through a series of peripheral passages 166 in the shield, one of which is shown in Fig. 2. These passages are located adjacent the plane at which vanes of the coupling elements terminate. The combined cross-sectional area of the discharge passages 166 is somewhat less than that of the intake passages 164 so that as long as the pump 144 is operating the coupling will be supplied with fluid. When the pump is stopped by the pilot, complete drainage of the coupling into the chamber enclosed by the housing 118 will take place. The oil discharged from the coupling is returned to the reservoir 148 through a conduit 168 which communicates with a stationary oil scoop 170 on the lowermost inner surface of housing 118 which faces in a direction opposite to the direction of rotation of the driving member of the coupling. It will be clear that due to the rotation of the coupling in the housing 118 the scoop 170 will pick up the swirling fluid and return it to the reservoir, even if the reservoir is mounted somewhat higher than the level of the scoop. Thus it can readily be seen that it would be possible to return the oil into the coupling by gravity and dispense with the power driven pump and nozzle 160. In such event all that would need to be added to the system would be a selector valve in the feed line.

The driver 96, as shown, has 20 vanes. Five of these vanes, equally spaced among the vanes have bosses 172 formed integral therewith on the side of the vanes. These bosses, as shown most clearly in Fig. 3, have passages 174 therethrough which also extend through the shell of the driver into the fluid discharge chamber enclosed by housing 118. These passages which have the same inclination as the vanes and additionally are inclined inwardly into the center of the vortex which would be formed by fluid in the coupling under driving torque serve to allow the air present in the coupling which is displaced by the incoming fluid to escape, and to bleed air which may have entered the coupling with the fluid into the fluid discharge chamber.

It will be evident from the above description of the illustrated embodiment of the invention that particularly advantageous means has been provided for filling and emptying a fluid coupling. It will further be evident that the means for filling and emptying the coupling are particularly advantageous in an inclined drive in which the fluid handling means of the prior application of Koup and Wagner are not applicable.

While only one embodiment of the invention has been illustrated it will be understood that various changes in the construction and arrangement of the parts may be made within the scope of the invention.

I claim:

1. A fluid coupling for use in a transmission including a driving member having an axis of rotation and comprising an annular cup rotatable about said axis, said annular cup having an inner edge and an outer edge around said axis, said driving member having vanes in its cup, a driven member comprising an annular cup, said driven member having vanes in its cup, the vanes of said driven member operably opposing the vanes of said driving member, fluid inlet passageways being located in said driving member for admission of fluid into operative contact with said members, said fluid inlet passageways having discharge ends opening into said members, said members being arranged to set up a vortex therein with the fluid moving over their respective inner sides within the cups, said fluid inlet passageways being directed toward the outer circumference of said members for admitting fluid which will move in the direction of said vortex, means for introducing fluid through said fluid inlet passageways into said members including a conical slinger plate carried by said driving member and having an active inner surface oblique with respect to the axis of rotation of said coupling and enclosing the inlet ends of said fluid inlet passageways, each fluid inlet passageway having, means for producing a venturi effect at its discharge end when fluid from the vortex passes over the end, the venturi effect acting to draw fluid through each of said fluid inlet passageways, and a conduit having its discharge end located within the confines of said plate for discharging fluid onto the active inner surface of said plate, said conduit having its discharge end located further from the axis of rotation of said driving member than the inner edge of the annular cup of said driving member, said active inner surface extending from the discharge end of said conduit to the inlet ends of said fluid inlet passageways so that it acts on fluid continuously from said discharge end of said conduit to the inlet ends of said fluid inlet passageways.

2. A fluid coupling for use in a transmission including a driving member having an axis of rotation and comprising an annular cup rotatable about said axis, said annular cup having an inner edge and an outer edge around said axis, said driving member having vanes in its cup, a driven member comprising an annular cup, said driven member having vanes in its cup, the vanes of said driven member operably opposing the vanes of said driving member, fluid inlet passageways being located in said driving member for admission of fluid into operative contact with said members, said fluid inlet passageways having discharge ends opening into said members, said members being arranged to set up a vortex therein with the fluid moving over their respective inner sides within the cups, said fluid inlet passageways being directed tangentially toward the outer circumference of said members for admitting fluid which will move in the direction of said vortex, means for introducing fluid through said fluid inlet passageways into said members including a conical slinger plate carried by said driving member and having an active inner surface at an angle with respect to the axis of rotation of said coupling and enclosing the inlet ends of said fluid inlet passageways, said inlet passageways extending from said conical slinger plate at the same angle with reference to the axis of rotation of said driving member, each fluid inlet passageway having means for producing a venturi effect at its discharge end when fluid from the vortex passes over the end, the venturi effect acting to draw fluid through each of said fluid inlet passageways, and a conduit having its discharge end located within the confines of said plate for discharging fluid onto the active inner surface of said plate, said conduit having its discharge end located further from the axis of rotation of said driving member than the inner edge of the annular cup of said driving member, said active inner surface extending from the discharge end of said conduit to the inlet ends of said fluid inlet passageways so that it acts on fluid continuously from said discharge end of said conduit to the inlet ends of said fluid inlet passageways.

References Cited in the file of this patent

UNITED STATES PATENTS

| | | |
|---|---|---|
| 1,616,252 | Bratvold | Feb. 1, 1927 |
| 2,187,667 | Sinclair et al. | Jan. 16, 1940 |
| 2,299,049 | Ziebolz | Oct. 13, 1942 |
| 2,539,004 | Becker | Jan. 23, 1951 |
| 2,562,657 | Blank et al. | July 31, 1951 |
| 2,570,768 | Clerk | Oct. 9, 1951 |
| 2,612,061 | Schjolin | Sept. 30, 1952 |
| 2,644,535 | Koup et al. | July 7, 1953 |
| 2,649,689 | Oding | Aug. 25, 1953 |

OTHER REFERENCES

"Aviation", November 1944, pages 125 to 133.